No. 867,183. PATENTED SEPT. 24, 1907.
J. H. BAKER.
BRAKE SHOE HEAD.
APPLICATION FILED NOV. 12, 1906.

4 SHEETS—SHEET 1.

WITNESSES:
J. Herbert Bradley.
Charles Barnett.

INVENTOR
James H. Baker
by Christy and Christy
Atty's

No. 867,183. PATENTED SEPT. 24, 1907.
J. H. BAKER.
BRAKE SHOE HEAD.
APPLICATION FILED NOV. 12, 1906.
4 SHEETS—SHEET 2.
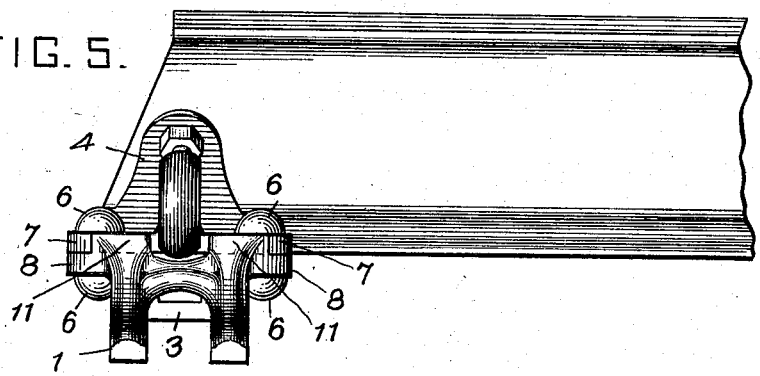
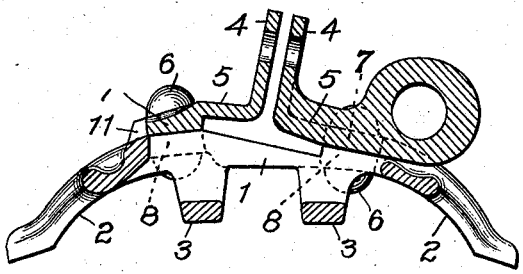
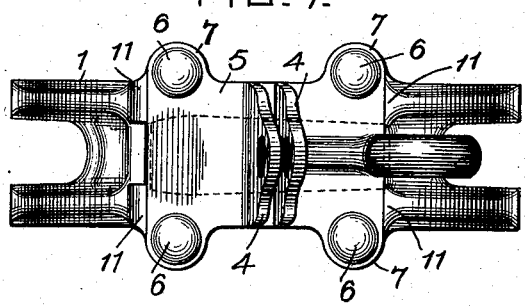
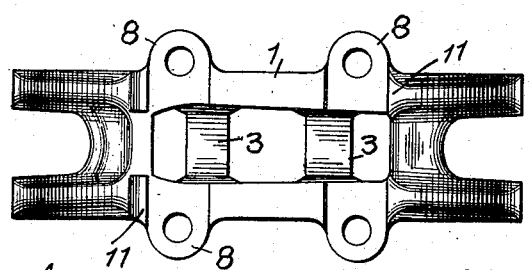
WITNESSES: INVENTOR
James H. Baker
by Christy and Christy
Atty's No. 867,183.

PATENTED SEPT. 24, 1907.

J. H. BAKER.
BRAKE SHOE HEAD.
APPLICATION FILED NOV. 12, 1906.

4 SHEETS—SHEET 3.

WITNESSES:
J. Herbert Bradley
Charles Barnett

INVENTOR
James H. Baker
by Christy and Christy
Attys

No. 867,183. PATENTED SEPT. 24, 1907.
J. H. BAKER.
BRAKE SHOE HEAD.
APPLICATION FILED NOV. 12, 1906.

4 SHEETS—SHEET 4.

WITNESSES:
J. Herbert Bradley.
Charles Barnett.

James H. Baker INVENTOR
by Christy and Christy
Atty's

UNITED STATES PATENT OFFICE.

JAMES H. BAKER, OF ALLEGHENY, PENNSYLVANIA, ASSIGNOR TO SOLID STEEL TOOL & FORGE COMPANY, OF BRACKENRIDGE, PENNSYLVANIA, A CORPORATION OF PENNSYLVANIA.

BRAKE-SHOE HEAD.

No. 867,183.　　　　Specification of Letters Patent.　　　　Patented Sept. 24, 1907.

Application filed November 12, 1906. Serial No. 343,064.

*To all whom it may concern:*

Be it known that I, JAMES H. BAKER, residing at Allegheny, in the county of Allegheny and State of Pennsylvania, a citizen of the United States, have invented or discovered certain new and useful Improvements in Brake-Shoe Heads, of which improvements the following is a specification.

The construction of brake heads or blocks now in use, is such as to render the manufacture thereof troublesome and expensive, as it involves the use of a number of baked cores.

The invention described herein has for its object a construction of brake head permitting of its manufacture either by casting without using, in any case, more than one baked core or by drop forging.

The invention is hereinafter more fully described and claimed.

Figure 1:
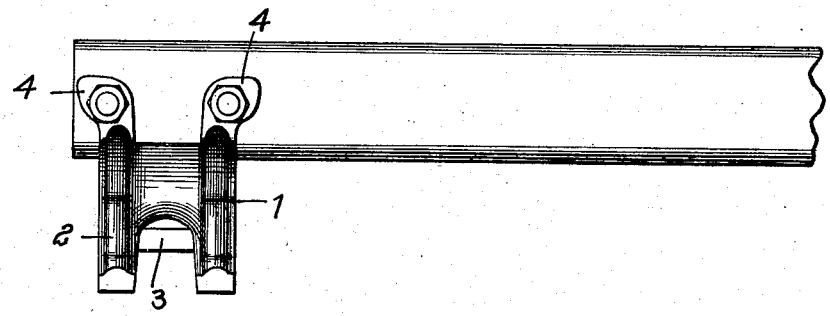
Figure 2:
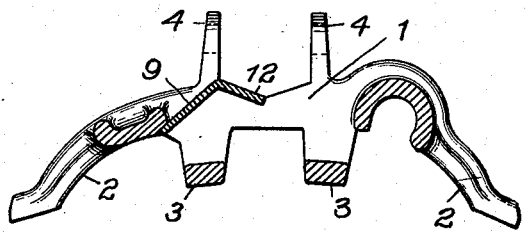
Figure 3:
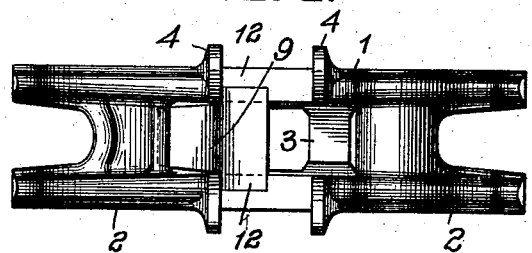
Figure 4:
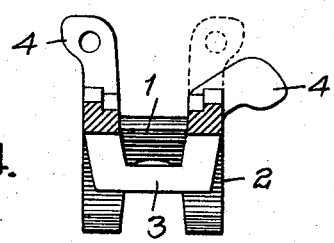
Figure 9:
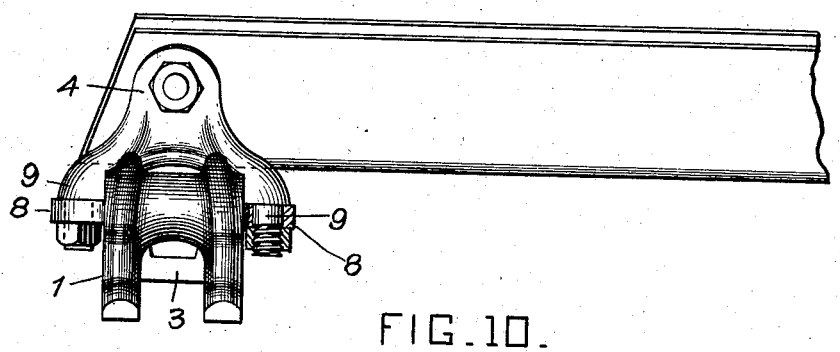
Figure 10:
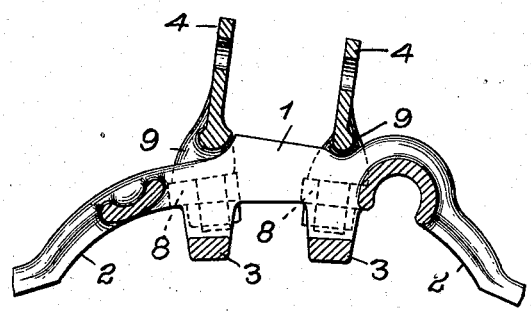
Figure 11:
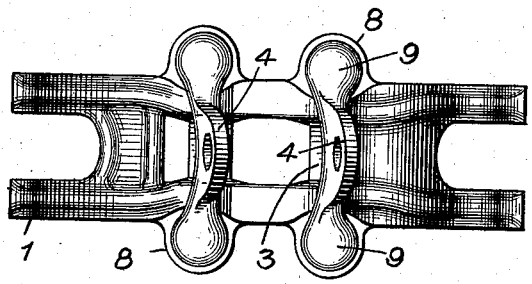
Figure 12:
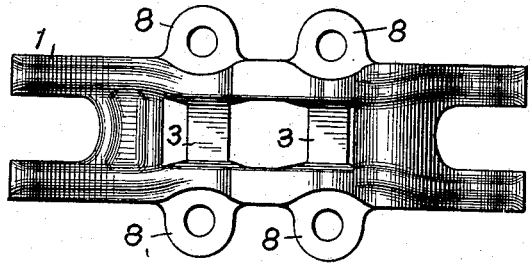
Figure 13:
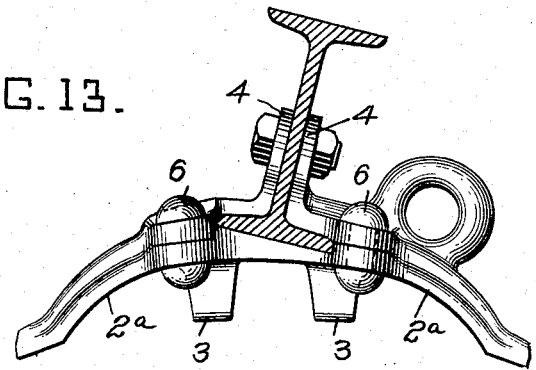
Figure 14:
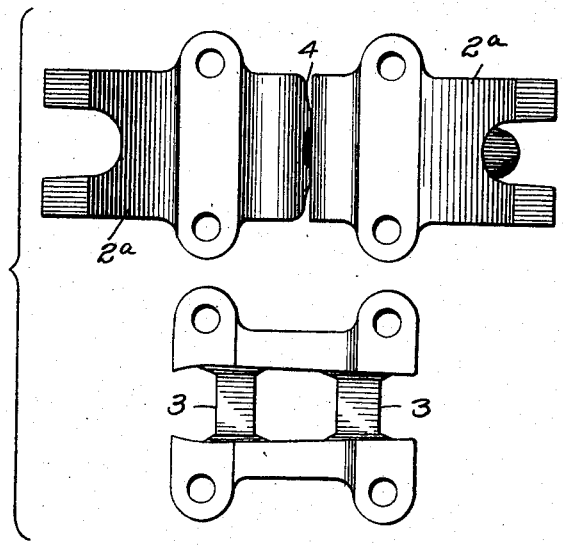

In the accompanying drawings forming a part of this specification, Figure 1 is a plan view of a portion of a brake-beam having my improved head applied thereto; Fig. 2 is a sectional view; Fig. 3 a rear elevation of the head; Fig. 4 is an end elevation showing the head in process of manufacture; Fig. 5 is a view similar to Fig. 1 showing the beam formed of a T or I shape and showing a modification of the head; Fig. 6 is a sectional view of the head shown in Fig. 5; Figs. 7 and 8 are rear elevations of the same, the ears or lugs for connecting the head to the beam being omitted in Fig. 8; Fig. 9 is a plan view showing a channel shaped beam and another modification of the head; Figs. 10, 11 and 12 are views similar to Figs. 6, 7 and 8; Fig. 13 is a side elevation of another modification of my improved head. Fig. 14 shows in bottom and top plan the several parts of head shown in Fig. 13 and Fig. 15 is a sectional elevation showing the parts of the head in proper relative positions but not secured together.

Brake heads are generally formed with a pair of perforated lugs or ears for connecting the shoes thereto, bearing portions on opposite sides of the ears or lugs, and ears or lugs on the rear side of the head, whereby the head is secured to the brake beam.

Figure 15:
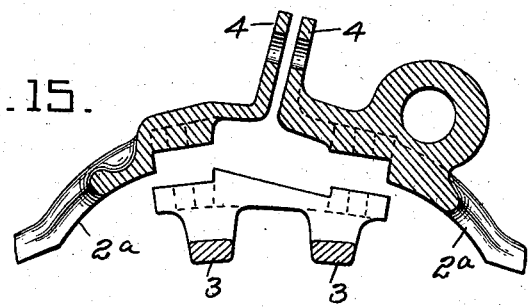

In the practice of my invention the body portion 1 of the head is made in the form of a frame substantially rectangular in shape as shown in Figs. 3, 8, 12 and 15. The bearing portions 2 for the shoe, *i. e.*, the portions supporting the shoes at or adjacent to their ends, may be formed integral with the body portion, as extensions of the ends of the frame, as shown in Figs. 2, 3, 6, 7, 8, 10, 11 and 12, or may be formed integral with the lugs or ears whereby the head is attached to the brake beam as shown in Figs. 13 and 15.

The ears or lugs 3 forming a part or member of the means employed for attaching the shoe to the head, are formed by angular or bent straps extending across the frame or body portion from one side to the other of said body portion.

The ears or lugs 4 whereby the head is attached to the brake beam are arranged on the back of the frame or body portion adjacent to the sides thereof. As shown in Figs. 1 2 and 3, these lugs may be formed integral with the frame or body portion, or may be made independent of the frame and secured thereto by bolts or rivets, as shown in Figs. 5 to 15.

It will be readily understood by those skilled in the art, that any of the forms shown, can be readily produced by molding and casting, without the use of baked cores, except for forming the bolt holes through the ears or lugs 4, and these holes may be formed after the casting by drilling. And further any of the forms shown can be produced by drop-forging. When forming the head shown in Figs. 1 to 3, the ears or lugs would be formed projecting laterally from the edges of the body portion as shown in Fig. 4 and would be subsequently bent up to proper position and brought to final shape and drilled.

In the construction shown in Figs. 5 to 8, the ears or lugs 4 are formed integral with a plate or flange 5 through which the ears or lugs are secured to the body or frame by bolts or rivets 6 passing through ears 7 and 8 in the flange and body portions respectively. In order to relieve the rivets 6 of shearing strains, shoulders 11 are formed on the frame or body portion to serve as bearings for the edges of the flanges or plates 5.

In the construction shown in Figs. 9 to 12, the ears or lugs 4 are formed with studs 9, which pass through the ears 8 on the body 1 and are secured in position by nuts screwing onto the studs or by spreading the ends of the studs in the manner of a rivet.

In the construction shown in Figs. 13 to 15, the lugs or ears 4 and the bearing portions 2ª of the head are formed integral with each other and are secured to the body or frame 1 by bolts.

It will be readily understood by those skilled in the art that the lugs or ears 4 may be so spaced apart and have a shape or contour corresponding to the brake-beam to which they are to be secured. As for example in Figs. 1, 2, 3, 9 and 10 these lugs or ears are spaced and constructed to fit a beam substantially rectangular in cross-section, while in Figs. 4, 5 and 13, the lugs are designed to be used with I or T beams.

In order to insure the proper insertion of the pin whereby the shoes are attached to the heads, a guiding plate 19 is arranged back of the lower lug 3 and extends below the same, as shown in Figs. 2 and 3. This plate is made of a width approximately equal to the opening in the frame or body portion and is provided at one end with wings 12 resting on the sides of the frame while the lower end of the plate is supported by the lower end wall of the opening through the body portion.

I claim herein as my invention:

1. A brake head having in combination an open or frame-like body portion, consisting of spaced side rails, angular strips extending across the space or opening between the side rails, and forming ears or lugs for holding the shoes and beam lugs or ears on the rear of the head.

2. A brake head having in combination a body portion provided with shoe-holding lugs or ears and beam lugs or ears formed independent of the body portion and adapted to be secured thereto.

3. A brake shoe head having in combination a beam or frame-like body portion consisting of spaced side rails and beam lugs or ears having flanges adapted to seat on the body portion and to be secured thereto, and lugs or ears projecting from the side rails for holding the shoes.

4. A brake head having in combination a body portion and beam lugs or ears provided with flanges adapted to seat on the body portion and extend beyond the ends of the same to form bearings for ends of the shoes.

5. A brake head having in combination an open or frame-like body portion, bent or angular straps extending across the frame from side to side and forming shoe supporting lugs or ears and beam lugs or ears separable from the body portion and adapted to be secured thereto.

6. A brake head having in combination a body portion having shoulder or stop for engaging the brake beam and beam lugs or ears formed independent of the body portion and of each other and adapted to be secured thereto.

7. A brake head having in combination a body portion and beam lugs or ears formed independent of the body portion and adapted to be secured thereto, the body portion being provided with shoulders forming lateral supports for the lugs or ears.

8. A brake head having in combination open or frame-like body portion consisting of spaced side rails connected at points adjacent to the ends of the side rails, angular strips extending across the space or opening between the side rails and arranged between the end connections and forming ears or lugs for holding the shoes and beam lug or ears on the rear of the head.

In testimony whereof, I have hereunto set my hand.

JAMES H. BAKER.

Witnesses:
CHARLES BARNETT,
J. HERBERT BRADLEY.